US008635337B2

(12) United States Patent
Edwards et al.

(10) Patent No.: US 8,635,337 B2
(45) Date of Patent: Jan. 21, 2014

(54) SYSTEM AND METHOD OF TROUBLESHOOTING

(75) Inventors: Lewin A. R. W. Edwards, Forest Hills, NY (US); Linda M. Cortese, Hauppauge, NY (US); Michael Garavuso, Lindenhust, NY (US)

(73) Assignee: Honeywell International Inc., Morristown, NJ (US)

( * ) Notice: Subject to any disclaimer, the term of this patent is extended or adjusted under 35 U.S.C. 154(b) by 152 days.

(21) Appl. No.: 13/212,580

(22) Filed: Aug. 18, 2011

(65) Prior Publication Data

US 2013/0047035 A1 Feb. 21, 2013

(51) Int. Cl.
*G06F 15/173* (2006.01)
(52) U.S. Cl.
USPC ............................................ 709/224; 709/220
(58) Field of Classification Search
USPC ........................................ 709/223–224, 220
See application file for complete search history.

(56) References Cited

U.S. PATENT DOCUMENTS

| | | | |
|---|---|---|---|
| 6,738,811 B1* | 5/2004 | Liang | 709/224 |
| 7,010,593 B2* | 3/2006 | Raymond | 709/224 |
| 7,227,450 B2* | 6/2007 | Garvy et al. | 340/286.05 |
| 7,509,415 B2* | 3/2009 | Baekelmans et al. | 709/224 |
| 8,301,762 B1* | 10/2012 | Lobo et al. | 709/224 |
| 2007/0100782 A1* | 5/2007 | Reed et al. | 707/1 |
| 2009/0327325 A1* | 12/2009 | Ramanathan et al. | 707/101 |
| 2011/0016355 A1* | 1/2011 | Watanabe et al. | 714/37 |

* cited by examiner

*Primary Examiner* — Philip B Tran
(74) *Attorney, Agent, or Firm* — Husch Blackwell LLP

(57) ABSTRACT

Systems and methods are provided wherein raw event indicating notices from one or more regional monitoring systems are automatically combined with one or more links to troubleshooting information specific to the device and/or event which triggered the respective notice. A configuration database and associated trouble shooting database provide model identification and specific event related information for maintenance personnel.

18 Claims, 2 Drawing Sheets

SYSTEM AND METHOD OF TROUBLESHOOTING

FIELD

The application pertains to and structures or methods to provide troubleshooting information relative to regional monitoring systems. More particularly, the application pertains to such systems and methods wherein raw event indicating notices from one or more regional monitoring systems are automatically combined with one or more links to troubleshooting information specific to the device and/or event which triggered the respective notice.

BACKGROUND

Regional, security oriented, monitoring systems can monitor a variety of conditions in a predetermined region, via associated peripheral devices, including sensing locations of various elements such as doors or windows, sensing glass breakage, monitoring movement or environmental conditions such as heat, fire, gas or the like, all without limitation. Known systems can communicate events or alarm indicators to displaced alarm monitoring networks, or central monitoring stations.

Current alarm panels have only general information about their associated, attached or wireless, peripheral devices. For example, a given control panel might know that zone 25 is a wireless device enrolled as an interior zone, but it would not know whether the zone is a PIR sensor, or a contact on an interior door.

Additional information as to a source or cause of an event, or trouble indicator, could be helpful to installers or maintenance personnel.

DETAILED DESCRIPTION

Figure 1:
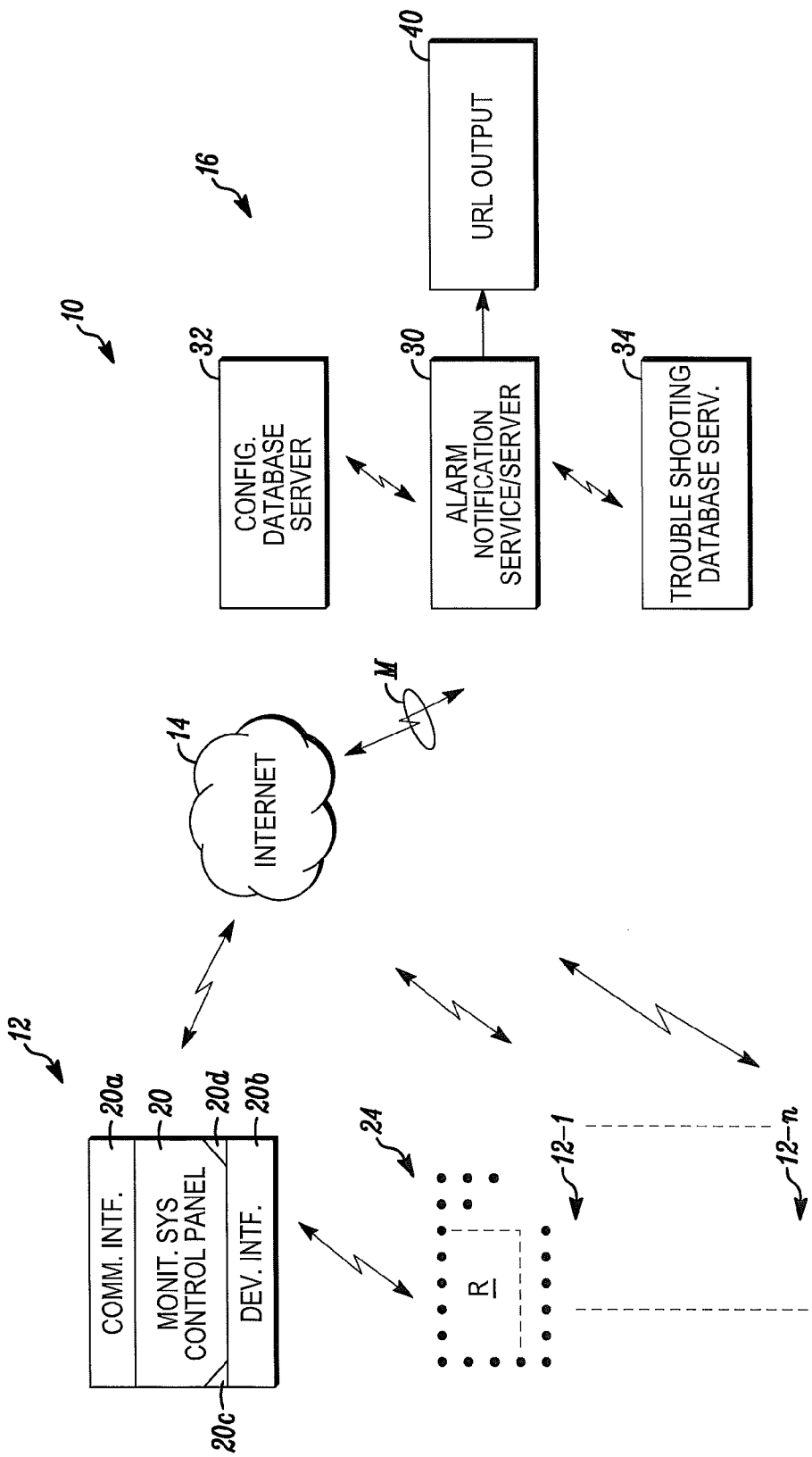
FIG. 1 is a block diagram of an embodiment hereof.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect hereof, an alarm, or monitoring system can include specific, pre-stored, information as to each of the peripheral devices, detectors, sensors, or the like coupled thereto. This information can include zone and, model numbers as well as any other enrolled device information such as serial numbers, or installation date.

In another aspect, a hosted, possibly subscription-based, application can be implemented. This process can enhance or expand information, for example alarm indicating E-mails, provided by alarm notification service.

In accordance herewith, every alarm email, including pre-alarm preemptive diagnostics, can include feedback in addition to the raw event notification information. A link can also be provided to pertinent troubleshooting information specific to the device and event that caused the notification.

These enhanced E-mails may be routed directly to an end user's maintenance, or service personnel. Alternately, the enhanced messages can be sent to an installer's email address or smartphone.

The above described process can advantageously improve productivity and provide labor savings to the installer. For example, by passing detailed help information directly to the end user or local maintenance staff, the installer does not have to send staff out when an event occurs. On the other hand, where the installer chooses not to pass messages to the end user, having a direct link sent to the installer's staff helps less-trained personnel provide high-quality service to the end user.

Exemplary types of information can include low battery related information, or maintenance related information. Instead of merely providing an event message which states, for example, "Zone 20 low battery", informational messages in accordance herewith can provide, exemplary, expanded trouble shooting information such as: "Zone 20 low battery. This zone is a 5800CO carbon monoxide sensor. Click here (URL) for a detailed guide on how to remove the sensor head and replace the battery on a 5800CO"; photos, video, etc. Relative to maintenance of peripheral units, a "clean-me" notification from a smoke detector can be coupled with a link to a page or video showing how to blow the dust out of the sensing chamber. These instructions can be specific to the exact detector model in use on the affected zone.

Implementation can include providing two database servers, one storing panel configurations, and the other storing a complete list of troubleshooting documents, images, video, etc. During set-up, account information as well as system configuration information can be transmitted to an associated alarm notification service/server and stored in an associated configuration database server. An associated trouble shooting data base server has available a library of information relative to all supported two database servers, one storing panel configurations, and the other storing a complete list of troubleshooting documents, images, video, etc.

In operation, an incoming event can be routed to the configuration database server which retrieves information pertaining to the particular peripheral which has initiated the event or alarm indication. Relevant troubleshooting information can be retrieved from the trouble shooting database server, for example, in the form of a URL, and then provided to end user personnel or to the installer's personnel for follow-up.

As illustrated in FIG. 1, a system 10 can include a plurality of monitoring systems 12, 12-1 . . . 12-n each of which monitors conditions in a respective region, such as the region R monitored by the system 12. A discussion of system 12, as will be understood by those of skill in the art will also be applicable to systems 12-1 . . . 12-n. System 12 can communicate one or more messages M, via wired or wireless access to a computer communications network, such as an Internet 14 or intranet, without limitation, to an alarm receiving network, or central station 16.

The monitoring system 12 can include a control panel 20 with associated electronics including an interface 20a for communicating via internet 14, and a device interface 20b. Interface(s) 20b can be in wired or wireless communication with a plurality 24 of detectors, sensors or other units all without limitation as would be understood by those of skill in the art. Panel 20 can include one or more programmable processors and pre-stored control circuitry 20c. Configuration information, relative to members of the plurality 24 can be stored in storage 20d.

Members of plurality 24 can include intrusion detectors, glass breakage detectors, door or window position detectors, smoke, gas, or fire detectors. Element 16 can include an alarm notification service/server 30, a configuration database server 32, and a trouble shooting database server 34, as explained below, relative to FIG. 2.

Figure 2:
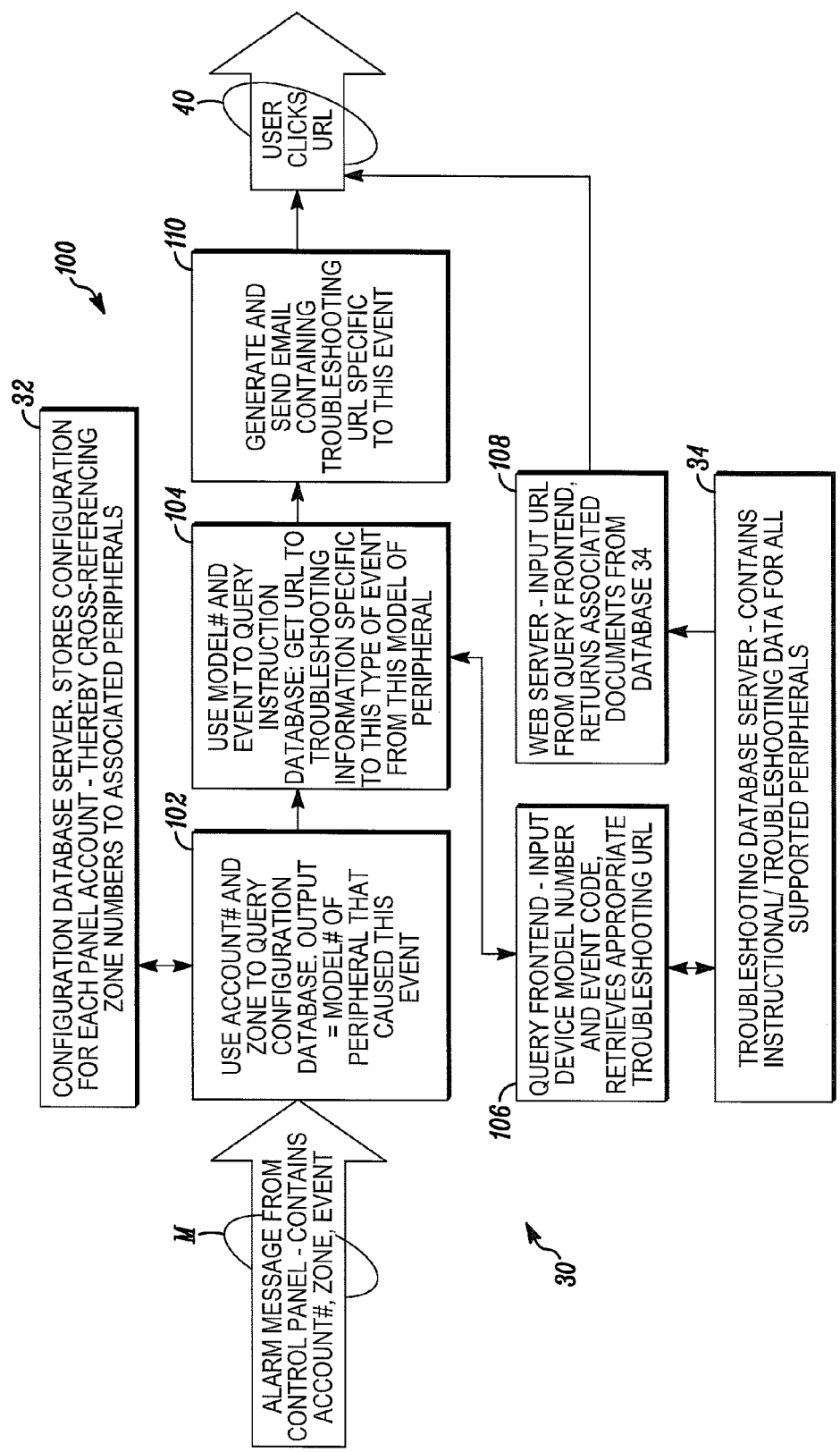
FIG. 2 is a flow diagram illustrating additional aspects of the embodiment of FIG. 1.

FIG. 2 illustrates aspects of a method 100. In response to the message M from monitoring system 12, the received account number and zone information can be used to query configuration database server 32. The related model number of the peripheral unit that caused this event is retrieved as at 102.

The retrieved model number and type of event can be used to obtain troubleshooting information from the database server 34, as at 104. The model number and event code can be input, as at 106 to obtain that information, as at 108.

A URL with associated troubleshooting formation can be generated and sent, as at 110, to user maintenance personnel or to installer personnel and retrieved, 40. Those of skill will understand that server 30 can include a graphical-user-interface with a display unit on which the output message can be presented. Alternately, it can be forwarded to a user's computer or smart phone for display.

In summary, the alarm message M is delivered to server 30. The message M preferably contains three pieces of data: the account number, which identifies the panel 20, the zone number, and the event code (e.g., low battery, fault, clean-me, end of life, etc.). The account# and zone number are used to query the configuration database 32. The account# locates this panel's record within the configuration database 32. The zone number is then used to look up, within the panel record, the model number of the associated peripheral.

At this point, the model number of the peripheral that caused this message is known along with the specific event code of the message being sent. This information is now passed to the query frontend, which looks up the relevant data, as at 106, from the troubleshooting database server 34. The output of this lookup is a URL directly to appropriate troubleshooting information. This URL is inserted in the notification email 40, which is sent to the end user, or other designated recipient.

By way of example: The panel 20 sends message M with account#=1234, zone 100, event code 5. The configuration database 32 retrieves information that account #1234, zone 100, corresponds to a model 5800CO carbon monoxide sensor. The query frontend, as at 106, determines that event code 5 for a model 5800CO is a sensor end-of-life event, and generates a URL to provide photos and other instructions on how to deal with this event, as at 108. The E-mail containing this URL is generated and sent to the end-user. The User clicks URL 40 and appropriate data is provide through the web server.

Further, if the panel 20 contains specific sequential serial number data, or date-of-manufacture information on the enrolled peripherals 24 it can provide additional information where necessary.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. An apparatus comprising:
   first storage for a database of configuration information for a plurality of regional monitoring systems;
   second storage for a database of device troubleshooting information for a plurality of peripheral devices for regional monitoring systems; and
   at least one processor, coupled to the storage, responsive to an incoming message, to obtain identifying information for a device specified by the incoming message, from the first storage database, and to obtain troubleshooting information for a device specified by the incoming message and the identifying information, from the second storage database.

2. The apparatus as in claim 1 which includes circuitry to visually provide an output indicium, which includes at least troubleshooting information responsive to the incoming message.

3. The apparatus as in claim 1 where the incoming message can include account, event, and device related information.

4. The apparatus as in claim 3 where the processor forwards at least the account and device related information to the first storage database to obtain the identifying information for the device from the first storage database.

5. The apparatus as in claim 4 where the processor forwards at least the identifying information for the device and the event related information to the second storage database to obtain the troubleshooting information from the second storage database.

6. A method comprising:
   establishing configuration information for at least one regional monitoring system;
   forwarding at least account identifying and the configuration information to a selected location;
   using the account information and the configuration information to establish at least one entry in a configuration database, including cross-referencing the configuration information with model information of at least one associated device of the regional monitoring system in the configuration database; and
   using the model information from the configuration database and the configuration information to establish at least one entry in a troubleshooting database, including cross-referencing the model information and the configuration information with troubleshooting information associated with devices of the regional monitoring system in the troubleshooting database.

7. The method as in claim 6 which includes forwarding an event specifying message from the regional monitoring system to the selected location, and, providing at least some of the information in the message to a query input of the configuration database.

8. The method as in claim 7 where, responsive to the provided information, the configuration database responds with a device model designation.

9. The method as in claim 8 which includes providing at least the model designation to a query input of the troubleshooting database.

10. The method as in claim 9 which includes retrieving troubleshooting information associated with the designated model.

11. The method as in claim 10 which includes providing at least one of a verbal or a visual output of at least the troubleshooting information.

12. The method as in claim 10 which includes forwarding the retrieved troubleshooting information to the regional monitoring system.

13. A system comprising:
- a plurality of regional monitoring systems wherein each system is coupled to a plurality of condition responsive devices;
- an alarm notification system, displaced from the monitoring systems and in communication therewith; and
- first and second databases associated with the alarm notification system with the first database containing configuration information for at least some of the monitoring systems, and the second database containing troubleshooting information for the condition responsive devices,
- wherein at least one of the monitoring systems transmits an event specifying message to the alarm notification system,
- wherein, responsive to the event specifying message, the alarm notification system uses information in the event specifying message to query the first database for model information associated with the event specifying message, and
- wherein, responsive to the model information, the alarm notification system uses the model information and the information in the event specifying message to query the second database for troubleshooting information associated with the model information.

14. The system as in claim 13 where the regional monitoring systems include circuitry to communicate with the alarm notification system.

15. The system as in claim 14 wherein the regional monitoring systems include circuitry to download configuration information to the alarm notification system.

16. The system as in claim 15 where the alarm notification system includes circuitry to store configuration information in the first database.

17. The system as in claim 13 where the troubleshooting information is provided, at least in part visually to a selected one of a mobile phone-type device, or a graphical user interface of a computer.

18. The system as in claim 17 wherein at least some of the regional monitoring systems include circuitry to provide updated configuration information to the alarm notification system in response to additional devices being coupled to the respective monitoring system.

* * * * *